United States Patent Office 3,124,218
Patented Mar. 10, 1964

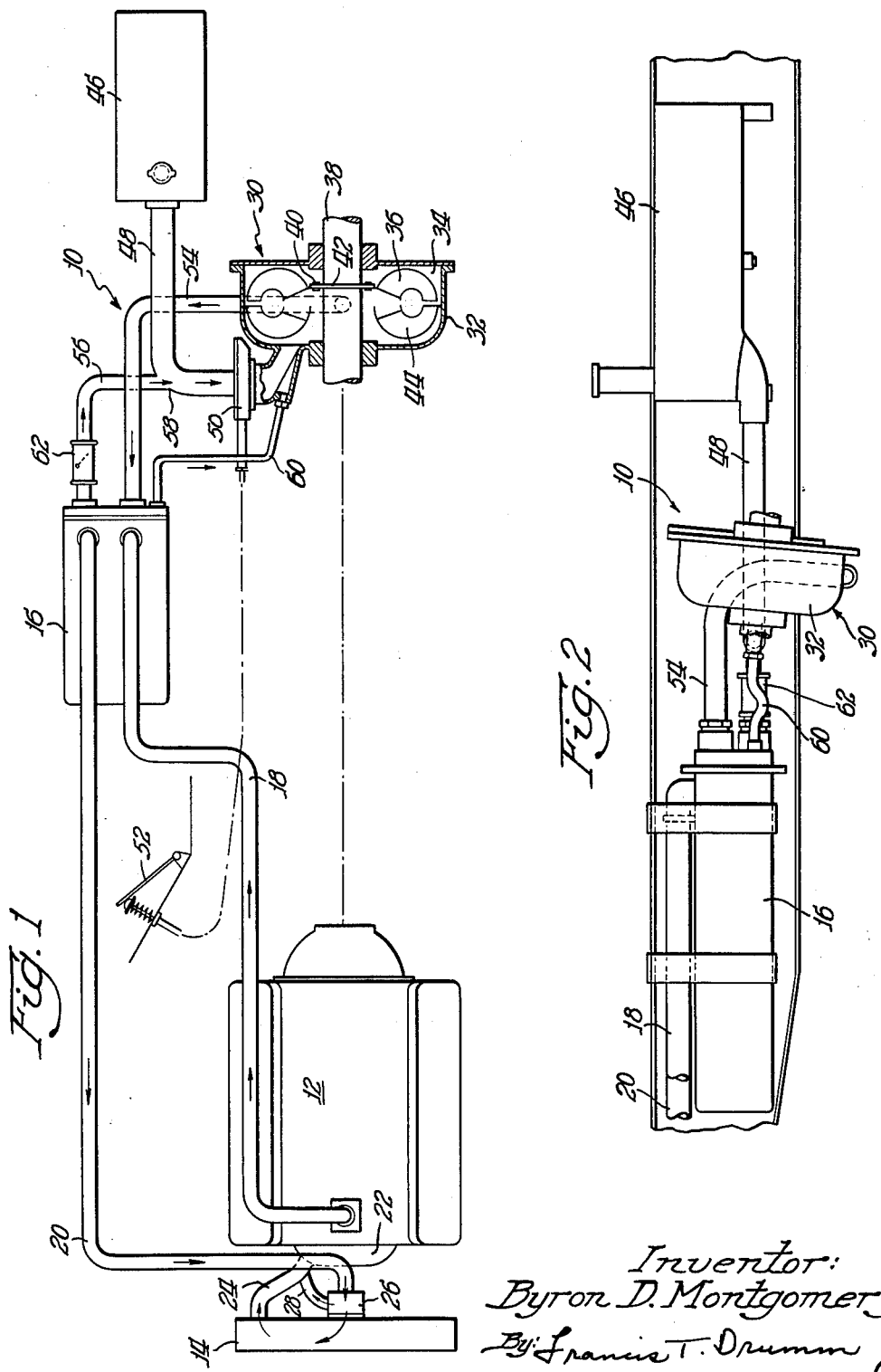

3,124,218
HYDRAULIC VEHICLE RETARDER
Byron D. Montgomery, Berkley, Mich., assignor to Borg-Warner Corporation, Chicago, Ill., a corporation of Illinois
Filed Aug. 7, 1958, Ser. No. 753,817
1 Claim. (Cl. 188—90)

This application relates to vehicle brakes and more particularly to a vehicle brake of the hydraulic coupling or hydraulic retarder type.

Heretofore, hydraulic retarders have been proposed for use in retarding the movement of automotive vehicles such as highway truck-trailer combinations and the like. The disadvantages of prior devices were that they were of insufficient capacity to effectively hold maximum loads at desired speeds, they could not be used continuously because of insufficient cooling, they were not sufficiently responsive to the operator's control to provide the requisite safety, the installation costs were excessive, and the weight of the systems was commonly such as to diminish the pay load appreciably. Furthermore, difficulty was experienced in providing sufficient cooling for residual hydraulic fluid in the retarder while the device was inoperative. Another difficulty with prior devices was that under certain fill conditions aeration of the fluid occurred with resultant fading and loss of retarding effect. To remedy the problem of aeration and fading a large supply of hydraulic fluid was required. This fluid was commonly retained in a relatively large reservoir positioned to afford a gravity head. Thus, the large fluid reservoir not only consumed valuable space but also contributed considerably to the decrease of the effective pay load.

A primary object of the invention is, therefore, to provide a vehicle brake of the hydraulic retarder type wherein the hydraulic retarder fluid supply system is characterized by compactness, relatively light weight and simplicity.

Another object of the invention is to provide a vehicle brake of the stated type which is capable of braking maximum loads at predetermined high speeds, which may be used continuously, which is immediately responsive to the direction of the operator, and which is relatively inexpensive to manufacture.

Another object of the invention is to provide a hydraulic retarder in accordance with the preceding objects wherein residual hydraulic fluid may be effectively cooled while the retarder is inoperative and wherein means are provided for effecting a uniform supply of hydraulic fluid to the retarder during off periods so that substantially uniform vacuum is present in the hydraulic retarder housing to assure uniformly rapid filling when desired.

A further object of the invention is to provide a brake or retarder of the type described which is characterized by the need for a relatively limited amount of hydraulic fluid, and which may be conveniently mounted within the side rails of the vehicle chassis.

This invention consists of the novel constructions, arrangements, and devices to be hereinafter described and claimed for carrying out the above stated objects and such other objects as will be apparent from the following description of preferred forms of the invention, illustrated with reference to the accompanying drawings, wherein:

FIGURE 1 is a diagrammatic view of a hydraulic retarder system made in accordance with the present invention and showing the relationship thereof to the cooling system of an automotive vehicle; and FIGURE 2 is a vertical elevational view illustrating the compact arrangement of the present hydraulic retarder system with respect to an automotive vehicle chassis.

Referring to the drawings and more particularly to FIGURE 1 the hydraulic retarder of the present invention is indicated generally by reference numeral 10 and is illustrated in association with a vehicle engine 12, a conventional vehicle liquid-to-air heat exchanger or radiator 14, and a secondary heat exchanger 16, of the liquid-to-liquid type, to which engine coolant flows through a conduit 18 and from which engine coolant flows by means of a conduit 20. The heat exchanger 16, as will be appreciated, receives liquid from the retarder 10 for cooling purposes. Indicated by reference numeral 22 is the water pump of the engine 12 which supplies pressure to the engine coolant in conventional manner. The pump 22 forces coolant through the engine coolant jacket and through the conduit 18 into the heat exchanger 16 from whence it normally returns through the conduit 20 to a thermostat 26 and into the radiator 14. The coolant passing through the radiator 14 is drawn into the suction side of the pump 22 through a conduit 24. When cooling of the coolant is not required it is by-passed by means of the thermostat 26 through conduit 28 to the suction side of the pump 22.

The hydraulic retarder system 10 includes a retarder unit 30 having a housing 32 forming a chamber 34 within which is arranged a rotor 36 illustrated as affixed to a drive shaft 38 by means of fastening elements 40 received in suitable circumferentially spaced openings in a radial flange 42 on the drive shaft 38. Confronting the rotor 36 is a stator 44 secured by any suitable means, such as by welding or the like, to the housing 32. The rotor 36 and the stator 44 are of the vaned type and are preferably of stamped metal construction. Preferably the blades or vanes of the rotor 36 and the stator 44 are of extreme curvature. For instance, the blades may have an angle of 45° at their outer edges and an angle of 58° at their inner edges with reference to a plane passing through the axis of rotation. Hydraulic fluid may be initially supplied to the chamber 34 from a reservoir or tank 46 by means of a conduit 48. The supply of fluid may be controlled by a valve 50 actuatable through any suitable means, such as mechanical linkages or the like, by a foot pedal 52 on the floor of the vehicle cab.

The fluid may be discharged from the chamber 34 by means of a conduit 54 which is in communication with the heat exchanger 16. When the valve 50 is open the fluid circulates through the heat exchanger 16 and is discharged through a conduit 56 which connects at 58 with the conduit 48. The fluid normally flows in a closed loop circuit from the retarder to the cooler 16 and back. There is no direct flow of oil to the tank 46 and, consequently, very little air is introduced into the fluid circuit and fading is substantially reduced. The tank 46 holds only enough fluid to provide adequate fill to the coolant closed loop system when the control valve 50 is on the full on position plus some reserve for any leakage that may occur.

When the control valve 50 is returned to the off position, the fluid in the retarder is pumped out by the pumping action of the rotor 36 and fills the conduit 54 and the cooler or heat exchanger 16. Surplus fluid backs into the tank 46. A relatively small quantity of fluid remains in the compartment 34 despite the pumping action of the rotor 36. In the past, difficulty has been experienced because of the excessive heat developed by the churning of this small amount of oil within the compartment through rotation of the rotor 36 while the retarder 30 is inoperative.

According to the present invention, a by-pass conduit 60 extends between the heat exchanger 16 and the chamber 34 to afford a circulation of this small amount of fluid between the heat exchanger 16 and the retarder chamber. It will be appreciated that the amount of residual fluid is inefficient to effect any retarding action. The conduit 60 is utilized also to supply a limited amount of fluid to the retarder when the vehicle is stopped. This amount of fluid is preferably in the order of ⅓ of the retarder chamber capacity. This fluid may be pumped out quickly, without causing noticeable drag, when the vehicle resumes motion. The flow of fluid from the reservoir 46 to the retarder chamber 34 when the vehicle is stopped and the control valve closed is prevented by means of a free flow check valve 62. When the control valve 50 is in the closed position the check valve 62 assures the requisite vacuum in the chamber 34 for a considerable length of time so that immediate filling of the chamber 34 may be effected when the valve 50 is operated by actuation of the pedal 52. The inlet to the chamber 34 may be restricted, if desired, to limit the maximum effective retarding capacity. It will be understood that when the valve 50 is closed, and the retarder 10 thus inoperative, the working fluid is expelled from the chamber 34 by the pumping action of the vanes 36 and passes to the heat exchanger 16 through conduit 54. When the heat exchanger 16 is completely filled, excess fluid is forced into the reservoir 46 through conduits 56 and 48. Back flow of fluid from the reservoir 46 to the heat exchanger 16 is prevented by means of the valve 62. During this inoperative period a limited circulation of fluid is effected between the heat exchanger 16 and the chamber 34 by means of the bypass conduit 60.

It will be noted that all of the units of the hydraulic retarder system 10 are located within the side rails of the chassis of the vehicle, as shown clearly in FIGURE 2. All of the space above the chassis rails may be utilized for other purposes.

It will be appreciated that when descending a grade the radiator of the vehicle may be used entirely for cooling the hydraulic fluid passing through the heat exchanger 16, since the engine radiator is not required to cool the engine coolant. If desired, the vehicle radiator may be of additional cooling capacity and provided with higher pressure cap. In addition, a higher speed cooling fan and water pump may be utilized in particular installations.

The above-described retarder exhibits important advantages over known retarders. For instance, the quantity of fluid required for operation is approximately three gallons, as compared to 22 and more gallons required for prior devices. Furthermore, the likelihood of inclusion of air in the system in minimized since the fluid enters and leaves the tank 46 by means of a single conduit. When the control valve 50 is closed and the chamber 34 is emptied by the pumping action of the rotor 36, the heat exchanger 16 and the conduit 54 are filled with fluid and the excess flows back into the tank 46. As mentioned previously this pumping action affords the vacuum in the chamber 34 to assure rapid fiilling when the valve 50 is opened. The degree of vacuum is controlled, of course, by the amount of fluid in the chamber. The amount of fluid in the chamber depends upon the cross-sectional area of the conduit 60.

While I have described my invention in connection with certain specific constructions and arrangements, it is to be understood that this is by way of illustration and not by way of limitation and the scope of my invention is defined solely by the appended claim which should be construed as broadly as the prior art will permit.

I claim:

An apparatus for retarding motion of a vehicle having a power transmitting driveshaft therein, comprising a housing having a fluid inlet, a fluid outlet, a vaned rotor rotatably mounted within said housing adapted to be connected to said driveshaft and a vaned stator non-rotatably mounted within said housing in operative relation to said vaned rotor; said housing being disposed substantially coaxially with respect to said driveshaft; an elongated heat exchanger having a bottom portion and a top portion positioned such that said bottom portion of said heat exchanger is about level with said fluid inlet; a tank having a bottom portion and a top portion positioned such that said bottom portion of said tank is below said top portion of said heat exchanger; first means communicating fluid from said fluid outlet directly to said heat exchanger, second means communicating fluid from said heat exchanger to said fluid inlet, by-pass means communicating fluid from said heat exchanger directly to said housing, flow control means to control the flow of fluid through said fluid inlet, check means in said second means to prevent the back flow of fluid through said heat exchanger and into said housing through said fluid outlet, and third means communicating fluid from said tank into said second means between said flow control means and said check means.

References Cited in the file of this patent

UNITED STATES PATENTS

| | | |
|---|---|---|
| 2,170,128 | Mater | Aug. 22, 1939 |
| 2,597,450 | Cline | May 22, 1952 |
| 2,634,830 | Cline | Apr. 14, 1953 |
| 2,768,711 | Cline | Oct. 30, 1956 |
| 2,790,518 | Wilson | Apr. 30, 1957 |
| 2,827,989 | Christenson | Mar. 25, 1958 |
| 2,864,473 | Christenson et al. | Dec. 16, 1958 |
| 2,889,013 | Schneider | June 2, 1959 |

FOREIGN PATENTS

| | | |
|---|---|---|
| 1,132,673 | France | Nov. 5, 1956 |